United States Patent [19]

Fischer et al.

[11] Patent Number: 5,773,481

[45] Date of Patent: Jun. 30, 1998

[54] POLYOLEFIN PARTICLE FOAM

[75] Inventors: Joachim Fischer, Grosskarlbach; Jens Rieger, Ludwigshafen; Klaus Hahn, Kirchheim; Isidoor De Grave, Wachenheim; Wolfram Kögel, Mannheim, all of Germany

[73] Assignee: BASF Aktiengesellschaft, Ludwigshafen, Germany

[21] Appl. No.: 760,406

[22] Filed: Dec. 4, 1996

[30] Foreign Application Priority Data

Dec. 4, 1995 [DE] Germany .......... 195 45 098.1

[51] Int. Cl.⁶ .......................................... C08J 9/22
[52] U.S. Cl. .................. 521/58; 521/60; 521/79; 521/143
[58] Field of Search ............... 521/79, 58, 60, 521/143

[56] References Cited

U.S. PATENT DOCUMENTS

| | | | |
|---|---|---|---|
| 4,968,723 | 11/1990 | Senda et al. | 521/58 |
| 5,026,736 | 6/1991 | Pontiff | 521/58 |
| 5,468,781 | 11/1995 | Sugano et al. | 521/58 |
| 5,605,937 | 2/1997 | Knaus | 521/58 |

*Primary Examiner*—Morton Foelak
*Attorney, Agent, or Firm*—Oblon, Spivak, McClelland, Maier & Neustadt, P.C.

[57] ABSTRACT

In a process for producing polyolefin foam particles, partially foamed particles are produced in a first stage by extrusion of a polyolefin containing solid blowing agents, and these are then further foamed in the second stage using steam.

5 Claims, 1 Drawing Sheet

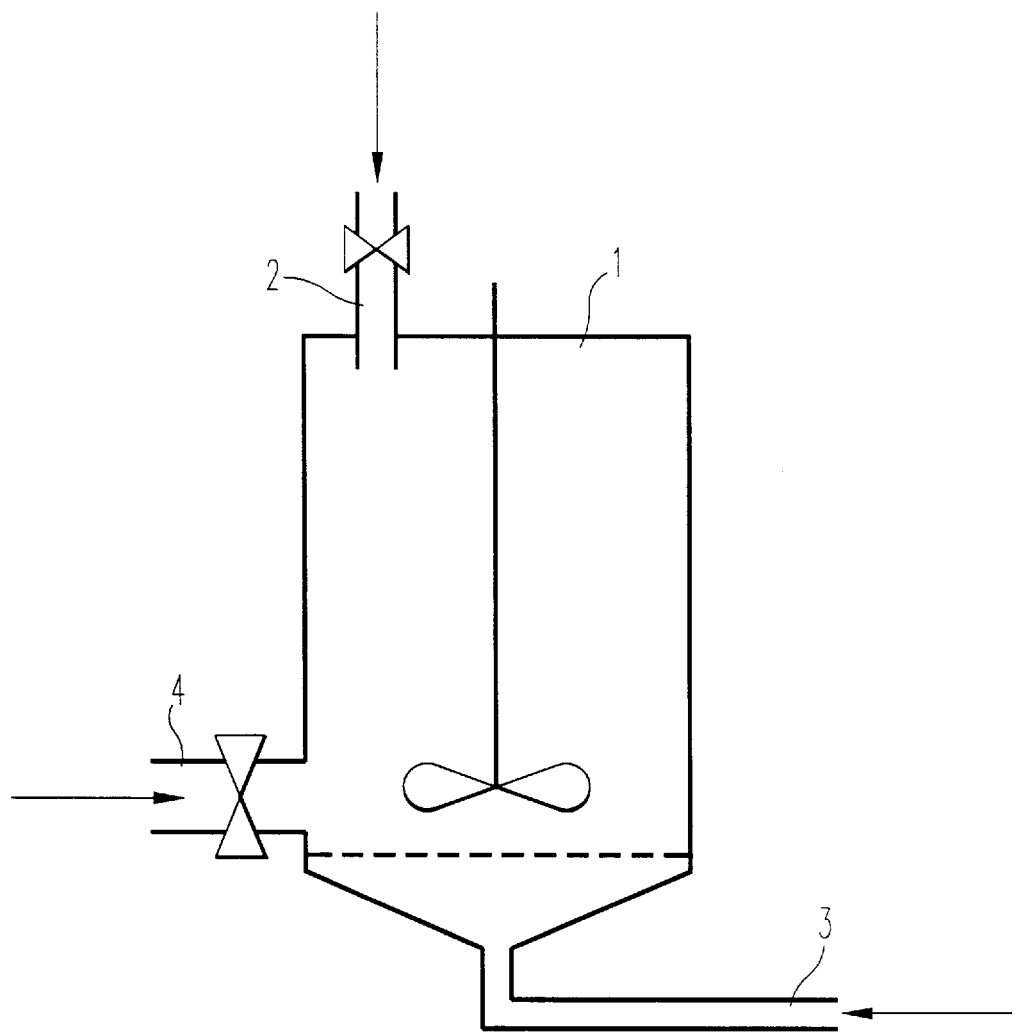

POLYOLEFIN PARTICLE FOAM

The present invention relates to a process for producing polyolefin foam particles having a bulk density of from 20 to 100 g·l$_{-1}$.

Polyolefin foam particles, particularly those based on a copolymer of propylene with small amounts of ethylene, are being used to an increasing extent for producing foam moldings in automobile construction, packaging and the leisure sector. The foam particles are customarily produced by suspending fine polyolefin granules in water, impregnating the granules with a volatile blowing agent under pressure at temperatures near the softening temperature of the polyolefin, depressurizing the granules and thereby foaming them (see EP-A 53333). In the foam particles produced in this way, the polyolefin has a specific crystal structure which is characterized by the DSC curve displaying a peak characteristic of the polyolefin and a high-temperature peak (known as a double peak).

Attempts have also already been made to divide the foaming process into a plurality of stages, so as to achieve greater flexibility in the setting of the desired bulk density matched to the respective application.

Thus, EP-A 108 245 describes a process for producing polypropylene foam particles in which prefoamed particles are given expandability by pressure treatment and are then post-foamed by means of hot air or steam. The prefoamed particles are produced by impregnation with a volatile blowing agent in aqueous suspension and depressurization. Their degree of expansion is, according to the examples, from 11 to 24, which corresponds to a bulk density of from 55 to 25 g·l$^{-1}$. According to EP-A 166 252, polyolefin foam particles are produced in a two-stage process. In this process, particles containing cell nuclei and having a degree of expansion of from 1.01 to 2 are first produced by extrusion of polyolefin resin containing decomposable foaming agents, these particles are then impregnated under pressure in aqueous suspension with an inorganic gas, preferably air or carbon dioxide, and foamed by depressurization.

All these processes have the disadvantage that they are carried out in aqueous suspension. This causes a high energy consumption because large amounts of water have to be heated, wastewater problems arise since the suspension contains stabilizers and other auxiliaries and, finally, a complicated washing process is necessary since the foam particles have to be purified of adhering auxiliaries.

It is an object of the present invention to develop a multistage process for producing polyolefin foam particles in which it is possible to avoid working in aqueous suspension. The foam particles obtained should have a crystal structure displaying a double peak, which results in favorable processing properties of the foam particles and good mechanical properties of the moldings produced therefrom.

We have found that this object is achieved by a process for producing polyolefin foam particles having a bulk density of from 20 to 100 g·l$^{-1}$, in which A. partially foamed particles having a bulk density of from 120 to 400 g·l$^{-1}$ are first produced by extrusion and granulation of a polyolefin containing blowing agent, and then B. the partially foamed particles are further foamed in one or more stages, wherein partially foamed particles free of blowing agent are, without prior pressure treatment, treated with steam at from 1.5 to 8.0 bar and from 110° to 170° C. for from 5 to 120 seconds, and depressurization is then carried out.

Suitable polyolefins for the process are polyethylenes of low, intermediate and high density of from 0.88 to 0.965 g/cm$^3$, polypropylene and ethylene and propylene copolymers containing at least 50 mol % of ethylene or propylene units. Suitable comonomers are, for example, α-alkenes having up to 12 carbon atoms, for example ethylene, propylene, butene, pentene, hexene, octene, also vinyl esters such as vinyl acetate, esters of acrylic acid, methacrylic acid, maleic acid or fumaric acid with alcohols containing from 1 to 8 carbon atoms, copolymers of ethylene and acrylic acid or their derivatives, and also ionomers. Mixtures of various olefin polymers can also be used.

Preference is given to using ethylene-propylene copolymers and copolymers of ethylene and/or propylene with a $C_4$–$C_8$–α–olefin.

Particularly preferred propylene copolymers are copolymers of propylene with from 0.5 to 6% by weight of ethylene or from 0.5 to 15% by weight of 1-butene. Particularly preferred ethylene copolymers are copolymers of ethylene with from 1 to 18% by weight of 1-butene, 1-hexene or 1-octene.

Particular preference is also given to copolymers of propylene with from 0.5 to 6% by weight, preferably from 1.5 to 6% by weight, of ethylene and from 0.5 to 6% by weight, preferably from 1.5 to 6% by weight, of a $C_4$–$C_8$–α–olefin such as 1-butene, 1-pentene, 1-hexene, 1-heptene or 1-octene. The copolymers should have a G-modulus of from 100 to 900 N/mm$^2$, preferably from 150 to 750 N/mm$^2$.

The copolymers are prepared in a known manner by copolymerization of the monomers by means of transition metal catalysts. The copolymers generally have a linear structure, are uncrosslinked and not fusion hardened. The crystallite melting point determined by the DSC method is generally from 95° to 170° C. The heat of fusion determined by the DSC method is generally from 30 to 130 J/g, preferably from 35 to 120 J/g. Preference is given to using copolymers having an MFI (230; 2.16) (in accordance with DIN 53 735) of from 0.1 to 50, in particular from 0.5 to 20 [g/10 min].

The partially foamed particles are produced by mixing polyolefin particles with a blowing agent in an extruder, homogenizing the composition and finally extruding it with foaming. The polyolefin particles are first mixed with a preferably solid blowing agent in the feed zone of the extruder. It is here possible to use a fine granular powder having particle sizes of from 0.01 to 10 mm, as is obtained directly in the polymerization process, or granules having particle sizes of from 0.1 to 10 mm, as are obtained in the extrusion of the polyolefin. Suitable blowing agents are compounds which liberate gases at elevated temperatures, for example azodicarbonamide, azobisisobutyronitrile, sodium hydrogen carbonate, sodium citrate, dinitrosopentamethylenetetramine or p,p'-semicarbazide and mixtures thereof. The amount of blowing agent depends on the desired bulk density of the foam particles. It is preferably from 0.2 to 5 parts by weight, based on 100 parts by weight of polyolefin. At this point it is also possible to add customary additives in effective amounts, for example dyes, pigments, nucleating agents, stabilizers, flame retardants, lubricants and antistatic agents.

The mixing and homogenization of polyolefin melt and blowing agent is generally carried out at from 180° to 240° C. and residence times of from 60 to 500 seconds. The mixture is then extruded from the extruder and granulated to form foamed particles having a diameter of from 0.4 to 5 mm. The bulk density of the partially foamed granules is from 120 to 400 g•l$^{-1}$, preferably from 150 to 300 g•l$^{-1}$.

It has surprisingly been found that these partially foamed polyolefin particles can be further foamed without prior pressure treatment with steam to form foam particles having the double peak if certain temperature and residence time limits are adhered to.

BRIEF DESCRIPTION OF THE DRAWINGS

A more complete appreciation of the invention and many of the attendant advantages thereof will be readily obtained as the same becomes better understood by the reference to the following detailed description when considered in connection with the accompanying drawings.

The further foaming of the partially foamed particles is advantageously carried out in a pressure prefoamer. The figure shows a schematic drawing of such a pressure prefoamer (1). The partially foamed particles are fed in at (2), steam is introduced at (3). The foamed particles are discharged through the line (4) which can be closed by means of a valve. This process can be carried out batchwise and, after appropriate modifications, also continuously. Depending on the temperature required, the steam pressure is from 1.5 to 8.0 bar, which corresponds to temperatures of from 110° to 170° C. In order to obtain foam particles having a double peak, the temperature during foaming should be in the vicinity of the melting range of the respective polyolefin, preferably ±5° C. above or below the temperature of the melting maximum of the DSC curve of the polyolefin. In the case of the particularly preferred propylene copolymers, the process is advantageously carried out using steam pressures of from 2.5 to 5.0 bar; in the case of ethylene copolymers using steam pressures of from 1.5 to 3.0 bar. If the steam pressure and thus the temperature is too high, there is a danger of the foam particles sticking together or collapsing; if the steam pressure is too low, the degree of expansion is too small. Relatively low steam pressures can be compensated for to some extent by prolonging the steaming time. This is from 5 to 120 seconds, preferably from 8 to 60 seconds. If very low bulk densities are sought, the steaming procedure should be repeated a plurality of times, preferably from one to four times, with the bulk density dropping further on each steaming. It is in principle not necessary to pressure-load the partially foamed particles prior to steaming, but if extremely low bulk densities are to be achieved, it can be advantageous to pressure-load the foam particles prior to the last steaming, for example by storage under pressurized nitrogen (eg. 2–6 bar) for a plurality of hours.

The foam particles produced according to the present invention have a bulk density of from 20 to 100 g•l$^{-1}$, in particular from 25 to 60 g•l$^{-1}$. They can be processed into foam moldings by customary methods.

EXAMPLE

A: Production of the partially foamed minigranules

The starting material used was an ethylene-propylene random copolymer having an ethylene content of 2.5% and an MFI (230, 2.16) of about 8 g•10 min$^{-1}$. This was processed together with aging inhibitors, a black pigment and 5000 ppm of azodicarbonamide in a ZSK 30 extruder to give partially foamed minigranules having a bulk density of 340 g•l$^{-1}$.

B: Production of the foam particles

The partially foamed minigranules obtained in stage A were further expanded for 18 seconds in a pressure prefoamer using 3 bar steam at 143° C. to a bulk density of 160 g•l$^{-1}$. After a regeneration phase of 24 hours, the dried foam particles were again treated with 3 bar steam for 18 seconds. The bulk density of the foam particles fell to 100 g•l$^{-1}$. After repeating the regeneration and drying, part of the foam particles was treated for 8 seconds with 3 bar steam; while the second part of the foam particles was stored for 2 hours under 4 bar of nitrogen prior to steaming. After the 3rd steaming, the bulk density of the foam particles was 90 and 85 g•l$^{-1}$ respectively. After pressure gassing (storage of the foam particles for 4 hours at 70° C. under 4 bar of nitrogen), the bulk density was 80 and 75 g•l$^{-1}$ respectively. The DSC spectra of the foam particles obtained after the 1st, 2nd and 3rd foamings all displayed a double peak.

We claim:

1. A process for producing polyolefin foam particles having a bulk density of from 20 to 100 g•l$^{-1}$, in which
   A. partially foamed particles having a bulk density of from 120 to 400 g•l$^{-1}$ are first produced by extrusion and granulation of a polyolefin containing blowing agent, and then
   B. the partially foamed particles are further foamed in one or more stages,
   wherein, in stage B, partially foamed particles free of blowing agent are treated with steam at from 1.5 to 8.0 bar and from 110° to 170° C. for from 5 to 120 seconds, and depressurization is then carried out.

2. A process for producing polyolefin foam particles as claimed in claim 1, wherein a solid blowing agent which liberates gas at elevated temperature is used in stage A.

3. A process for producing polyolefin foam particles as claimed in claim 1, wherein the steam treatment in stage B is carried out at a temperature which is ±5° C. above or below the temperature of the melting maximum in the DSC curve of the respective polyolefin.

4. A process for producing polyolefin foam particles as claimed in claim 1, wherein the steam treatment of the partially foamed particles is carried out without prior pressure loading of the particles.

5. A process for producing polyolefin foam particles as claimed in claim 1, wherein the steam treatment according to stage B is repeated from one to four times.

* * * * *